United States Patent [19]

Davister

[11] Patent Number: 5,088,852

[45] Date of Patent: Feb. 18, 1992

[54] PINNED TYPE CONNECTOR MEANS FOR LATTICE SPACE STRUCTURES

[76] Inventor: Michael D. Davister, 4708 Carterwood Dr., Fairfax, Va. 22032

[21] Appl. No.: 421,084

[22] Filed: Oct. 13, 1989

[51] Int. Cl.$^5$ .............................................. B25G 3/00
[52] U.S. Cl. ...................................... 403/19; 403/90; 403/171; 403/143
[58] Field of Search .................. 403/56, 90, 170, 171, 403/176, 143, 77, 172, 19; 52/81, 648; 248/288.3, 288.5

[56] References Cited

U.S. PATENT DOCUMENTS

| | | | |
|---|---|---|---|
| 1,405,221 | 1/1922 | Jenkins | 248/288.5 X |
| 1,833,649 | 11/1931 | Kartvelichvili et al. | 403/90 X |
| 2,861,501 | 11/1958 | Strelakos | 403/77 X |
| 4,511,276 | 4/1985 | Doutt | 403/77 |
| 4,766,712 | 8/1988 | Hale | 403/176 X |

*Primary Examiner*—Andrew V. Kundrat

[57] ABSTRACT

A pin connector means for removably affixing structural members to central nodes enabling the erection of structural latticeworks is disclosed. The pin connector means includes a ball-ended bolt, a bearing seat, and a means for coupling a spherical ball of the ball-ended bolt to the bearing seat. The surface of the spherical ball and the contact surface of the bearing seat are finished to be of low friction. A threaded rod extending from the spherical ball of the ball-end bolt screwably affixes into an endpiece of a structural member. The bearing seat for receiving the spherical ball of the ball-ended bolt is affixed to a central node. Each of the central nodes can receive a plurality of the pin connector means. The latticework comprises a plurality of central nodes and a plurality of structural members, the structural members being enabled to removably affix to the central nodes using a pin connector means.

15 Claims, 3 Drawing Sheets

PINNED TYPE CONNECTOR MEANS FOR LATTICE SPACE STRUCTURES

BACKGROUND OF THE INVENTION

1. Field of the Invention

The present invention relates to connectors used to erect three-dimensional arrays of polyhedral elements made from prismatic or nonprismatic structural members. Specifically the invention relates to a pinned connection between the members and socketed central nodes to facilitate rapid assembly and behavior which can be predicted, especially when the members are subjected to large compressive loads.

2. Description of the Background Art

Three-dimensional arrays of polyhedral elements can be formed into flat or curved lattices which may be enveloped by a cover shell which transmits external pressures to the lattice. These structures are highly suitable for the coverage of large areas such as sports arenas etc., for the enclosure of large volumes such as storage tanks, and for use in different applications in outer space.

The fundamental behavior of lattice structures differ depending on the type of connectors used to attach the member ends to the nodes. In a structural sense, connector types vary from being pinned to fully rigid. Pinned connectors offer no bending resistance and rotational continuity between the members common to a central node. Fully rigid connectors maintain complete continuity and transfer bending moments between the members and the nodes. Differences in behavior arise because of the stability characteristics of admissible deformation modes in postbuckling and the influence of imperfections. Imperfections reduce the load-carrying-capacity of real structures from theoretical predictions by amounts which are strongly dependent on the stability of the structure under high loads. In a lattice with rigid connections, both stable and unstable postbuckling deformation modes exist. Since there is no reason for the lattice to select a high energy level over a lower level, the lattice will deform in the unstable mode, resulting in a reduced load carrying capacity from that theoretically predicted. The actual peak load may be as low as thirty percent of the theoretical value. If the mode is highly unstable, the structure will collapse in a violent manner.

In a pinned lattice, the postbuckling deformation modes may be stable or unstable. In general, these modes are not as unstable as those of rigidly jointed lattices and load-carrying-capacities are not as drastically reduced from theoretical values. If highly unstable modes exist, they may be mitigated by stiffening certain members in the lattice allowing the postbuckling modes to occur under relatively stable conditions, and at the same time inc ease the load-carrying-capacity.

Improved stability and increased strength require the accurate prediction of structural response. Currently a large gap exists between the theoretical and the actual response of lattice structures due to the dominating effect of the joint type. In practice, joints are neither rigid nor pinned but are semirigid. The added complexities involved in both the mathematical modeling of semirigid joints and their unknown behavior under different combinations of forces are not conducive for improving the stability and the load-carrying-capacity.

Connectors used for assembling lattices must be designed to enable a member to be inserted between two fixed nodes. The connectors must also permit a minor shortening or lengthening of the member. An additional advantage exists if the connector permits a minor deviation in the directional axis of the member from its predetermined geometry.

Several systems for constructing lattice structures used for covering large areas etc. exist. Below is a description of these systems and details of the connectors used to assemble the lattice. Further details are also given in Exhibit A.

The first of the modern space structures was the MERO system which was used extensively in 1957 at the International Building Exhibition in Berlin. This system uses a threaded bolt to attach tubular members fitted with cone-shaped endpieces to spherical socketed nodes. The attachment is made by turning a slotted nut which engages a pin fixed to the bolt. As the nut is turned, the bolt emerges from the nut and engages the threads in the socket of the spherical node. The MERO system makes it possible to insert a member between any two fixed nodes. This connection scheme is considered semirigid and its behavior is subjected to the unstable postbuckling deformation modes associated with lattices employing rigid connections. Also, this system requires exact alignment of the member axis with the socketed nodes necessitating extreme control during manufacture and assembly.

The Zublin Space Truss System has been on the market in Germany since 1977. This system consists of tubular members with tapered ends which are connected to spherical nodes by means of special bolts. The connector bolt has two threads of different pitch. On the node side, there is a standard pitch whereas on the member side there is a fine pitch. Between the two threads is either a hexagonal portion on which a wrench collar can slide or a threadless portion with two opposing studs on which a circular collar with internal grooves can slide. The collar serves as a spacer between the member and the node and is required for turning the bolt by means of a wrench. Before turning, there is play of several threads between the collar and the node. With each turn, the bolt is moved closer to the node by the difference between the two pitches, thus diminishing the play until the connection is tight. This connection is also semirigid because of the significant moment transferred by the bolt and collar to the nodes. Careful alignment is also required of the member axis and the axis of the sockets in the node.

Tomoegumi Iron Works, Ltd., of Japan developed the TOMOE UNITRUSS system. This system is composed of spherical socketed nodes, high strength connectors and tubular members with nose-cone endpieces. The connectors used for the attachment of the endpieces to the nodes consist of threaded portions on each end separated by a hexagonal segment to accommodate a hexagonal wrench. As the connector is turned it unscrews from the nose-cone and engages the threaded sockets in the nodes. Right-hand and left-handed screws on the member end of the connectors allow the distance between two nodes to be adjusted by rotating the structural members. On completion of assembly, set screws in the nose-cones are tightened to prevent the connections from becoming loose. This assembled structure is also considered semirigid due to the moment transferred by the bolts. In addition, careful alignment is required during assembly.

The NS Space Truss System developed by Nippon Steel Corporation of Japan uses spherical nodes, pipes with end cones and threaded bolt connectors. This system uses hollow spheres sufficiently large such that the bolts are inserted into the end cones from inside the sphere. Openings exist at the poles of the spheres to allow the bolts to be inserted and tightened with a rachet socket wrench. Washers are used between the nodes and the pipe members where the node side of the washer is concave to match the contours of the sphere. The washer bolt combination transfers significant moment to make this a semirigid connection. Another complexity is introduced via the usage of large hollow spheres which may undergo deformations larger than the axial deformations of the members. It appears that exact alignment is crucial for assembly of the NS System.

Other systems for constructing space structures also exist which do not rely on attaching members to nodal spheres. These employ a variety of hardware. Typical of these is the Temcor System in which aluminum wide flange sections are bolted to circular gusset plates. Such systems are limited to certain geometrical shapes and defy prediction because of mathematical complexities involved in modeling the joints.

A connection system for assembling space structures does not exist in which the connectors may be treated as pinned or quasipinned. Pinned connectors allow for the exploitation of the high load-carrying-capacity of space structures while at the same time make space structure lattices safer by improving the stability characteristics at high loads. Also, there is a need for a connector which facilitates rapid construction by permitting minor deviations in both axis alignment and member length.

SUMMARY OF THE INVENTION

The invention is a pin connector means comprising a ball-ended bolt, a bearing seat, and a means for coupling a spherical ball of the ball-ended bolt to the bearing seat. A threaded rod extends from the spherical ball of the bolt and screwably affixes into an end of a structural member. The bearing seat for receiving the spherical ball is affixed to a central node. The surface of the spherical ball and the contact surface of the bearing seat are finished to be of low friction.

The invention is a latticework with predictable behavior comprising a plurality of central nodes and a plurality of structural members, the structural members being enabled to removably affix to a central node using a pin connector means. The pin connector means includes a ball-ended bolt, a bearing seat, and a means for coupling a spherical ball of the bolt to the bearing seat. The surface of the spherical ball and the contact surface of the bearing seat are finished to be of low friction. A threaded rod extending from the spherical ball of the ball-ended bolt screwably affixes into an end of one of the structural members. The bearing seat for receiving the spherical ball is affixed to one of the central nodes and each of the nodes can receive a plurality of the pin connector means.

Figure 1:
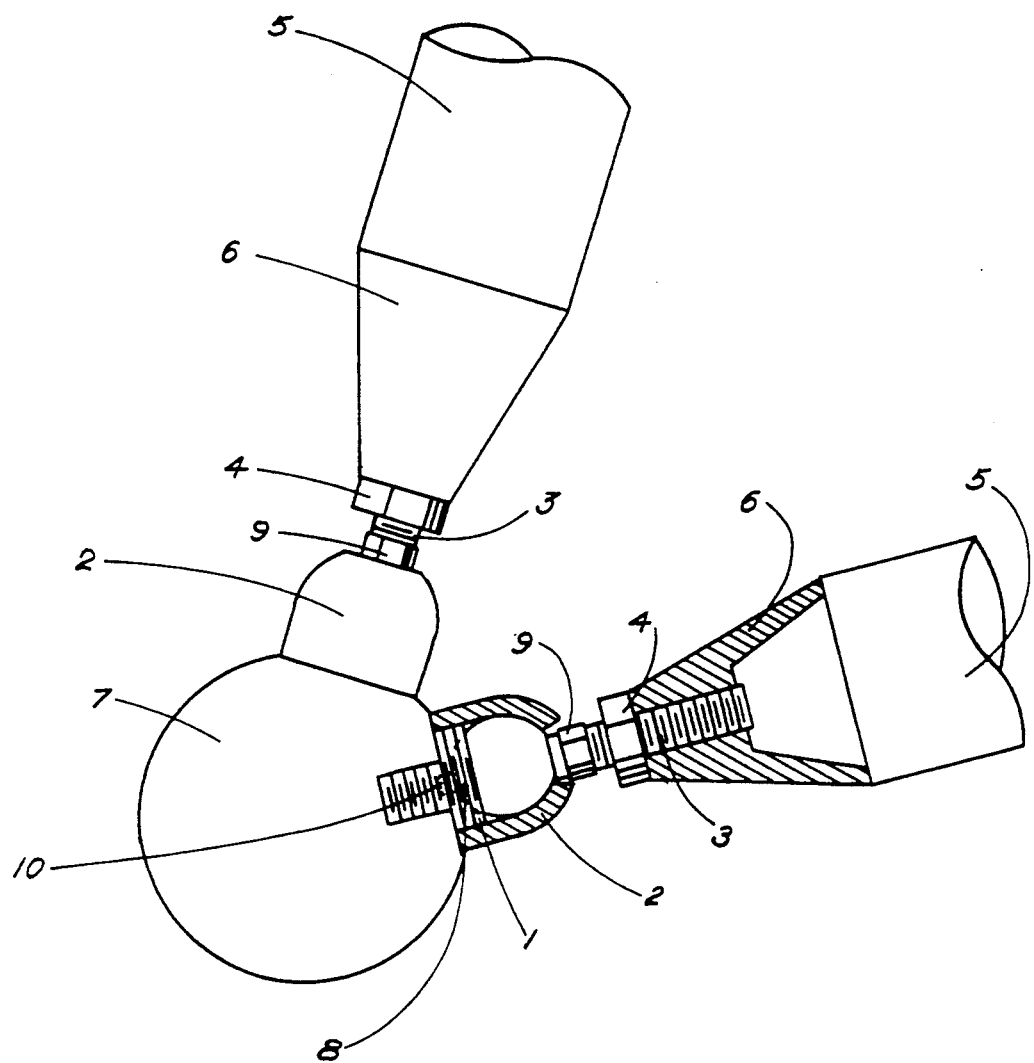
FIG. 1 illustrates the parts used to attach a member with tapered endpieces to a spherical socketed node.

| Reference Numerals in Drawings | |
| --- | --- |
| 1 bearing seat | 7 central node |
| 2 coupling means | 8 concave recess |
| 3 ball-ended bolt | 9 wrenching surface |
| 4 lock nut | 10 wrenching socket |
| 5 structural member | 11 wrenching collar |
| 6 member endpieces | |

DETAILED DESCRIPTION OF THE INVENTION

The invention is a pin connector means for removably affixing structural members to central nodes enabling the erection of structural latticeworks. The pin connector means includes a ball-ended bolt, a bearing seat, and a means for coupling a spherical ball of the ball-ended bolt to the bearing seat. The surface of the spherical ball and the contact surface of the bearing seat are finished to be of low friction. A threaded rod extending from the spherical ball of the ball-ended bolt screwably affixes into an endpiece of a structural member. The bearing seat for receiving the spherical ball is affixed to a central node. Each of the central nodes can receive a plurality of the pin connector means. The latticework comprises a plurality of central nodes and a plurality of structural members, the structural members being enabled to removably affix to a central node using the pin connector means.

The primary basis of this invention is the potentially greater safe load-carrying-capacity and response predictability that can be achieved for a structural latticework employing pinned connectors between the member ends and central nodes compared to one with rigid or semirigid connectors. The connector means of this invention functions as a pinned connector and therefore permits the accurate prediction of the behavior of an individual member under large compressive forces and the corresponding stability of the plurality of members and nodes used in forming the structural latticework. This invention also facilitates the rapid erection of structural latticeworks by eliminating severe alignment requirements between the member axis and the axis of the bored and tapped sockets in the central nodes.

In order to defer buckling failure, it is desirable that the structural members be fabricated from materials having a high elastic modulus and with cross sections having a large moment of inertia. It is also desirable that the members be lightweight. Consequently, the structural members are commonly circular steel tubes that are welded or seamless. Yield strengths of the steel may be as high as 100,000 pounds per square inch. Tube diameters can range from one inch to one foot or more depending on the structural requirements. Other commonly available shapes may also be used for the structural members. These include rectangular tubes and cross sections which are solid.

The member endpieces are commonly made from high strength steel. If the members are circular, the endpieces are usually tapered but need not be. Circular or rectangular plugs with a bored and tapped central socket may also be joined to the member end for screwably affixing the ball-ended bolt. Forging, machining and casting can be used to manufacture the tapered ends which can be joined to the tubes by arc welding or friction welding. Friction welding of the tapered ends allows different materials to be joined, e.g. aluminum tubes can be joined to forged ends made of stainless steel. If the structural members are solid, no special endpieces are required since the member end itself can be bored and tapped.

The central nodes are typically steel spheres and can be hollow or solid. Casting, forging or machining or a combination of these methods are used to achieve the desired spherical shape. Hollow spheres have an advantage because they are lighter and the internal space can accommodate the chips resulting from boring and tapping the sockets for the bearing seats. A flat surface around each socket is desirable to accommodate the bearing seat and better transfer compressive forces to the node. Automated machining of the spheres, boring and tapping of the sockets, and machining of the flat surface is common in the industry, such that it takes only a few minutes to fabricate a sphere. The spheres typically range from one inch to one foot in diameter depending on the size of the members, the angles between the members, and stress related design requirements. As many as twenty members may be attached to a single node, but ten is more common in a typical double layer lattice.

Although the connector means promotes the prediction of member behavior under large compressive loads, the connector means must transfer both tensile and compressive forces between the member ends and the central nodes. This is because the lattice can be subjected to different loading combinations which can cause stress reversals in the members. At the member end, tensile and compressive forces are accommodated by screwably affixing a ball-ended bolt to the member ends. At the node end, contact pressures between a spherical ball and a concave recess in the bearing seat transfer compressive forces to the node. A coupling means which encloses the spherical ball of the ball-ended bolt serves to transfer tensile forces when screwably affixed to the bearing seat. When the member is in compression there is no contact between the spherical ball and the coupling means. Likewise, there is no contact between the bearing seat and the spherical ball when the member is in tension. In this manner, rotational movement of the member end is enhanced.

One bearing seat is screwably affixed to a central node for each member that has an end common to the node. A bearing seat has a threaded enlarged end to which a coupling means can be screwably affixed during assembly of the lattice. The bearing seat also has a smaller threaded stem that screwably affixes to a socket in the central node. A wrenching socket opposite the smaller threaded stem is used to affix the bearing seat to a node by means of an allen-type wrench. A variety of forging operations commonly used in the manufacture of high strength bolts can be used to manufacture the bearing seat. Medium carbon alloy steel with corrosion resistance is highly suited for the bearing seat.

The concave spherical recess in the bearing seat is of the same diameter as the spherical ball of the ball-ended bolt. A typical depth of the recess is one-quarter to one-half the diameter of the ball. The diameter of the ball is slightly less than the diameter of the enlarged end of the bearing seat in order that the ball does not come in contact with the sides of the coupling means and can thus pivot freely. The diameter of the ball is selected such that allowable bearing stresses between the ball and the bearing sear are not exceeded. The surface of the spherical ball is finished to be of low friction. The surface of the concave recess is additionally finished to provide a low friction bearing surface.

Different options are available for achieving the desired structure of the ball-ended bolt. The first option includes a rod with a wrenching surface that screwably affixes to a spherical ball that has been bored and tapped. A second option includes a rod with a wrenching surface, and only one half of the spherical ball (a shape resembling a carriage bolt with a collar). The remaining hemisphere of the ball can be bored and slipped onto the rod (akin to a washer) to form the required spherical ball. Forging techniques that are commonly used in the manufacture of high strength bolts can be used in both options. Medium carbon alloy steels with protective coatings that resist corrosion are also highly suitable for fabricating the ball-ended bolt. That portion of the ball in contact with the bearing seat is additionally finished to provide a low friction hardened surface.

A coupling means includes a cylindrical shell portion that is tapped and a spherical shell portion with a bored cylindrical hole from which the rod of the bolt protrudes. Medium carbon alloy steels are suitable for the coupling means, and a variety of forging methods (e.g. upset forging and drop forging) are available for manufacturing the coupling means. The walls of the coupling means must be sufficiently thick such that excessive deformations do not occur when the member is in tension and the walls of the coupling means are being stretched. Additional thickness of the coupling shell is desirable around the cylindrical hole in the coupling means from which the bolt protrudes in order to eliminate the possibility of the ball pulling free or the development of large undesirable strains around the hole. The hole is considerably larger than the diameter of the stem of the threaded rod (one and one-half to twice the diameter of the rod stem) in order to permit the ball-ended bolt to pivot freely. The dimensions of the coupling means are such that the inside surface of the spherical shell cap just makes contact with the encased spherical ball of the ball-ended bolt when the coupling means is fully screwed onto the bearing seat. If this were not the case, the ball-ended bolt would not pivot freely and the connector means would behave as a rigid or semi-rigid connector.

Prior to shipping the disassembled lattice to the construction site, the bearing seats are screwably affixed to the central nodes, while the ball-ended bolts with coupling means and lock nuts are screwably affixed to the endpieces joined to the structural members. During assembly, a spacer tool that forms a snug fit between the coupling means and the lock nut, when the exposed portion of the bolt is of the correct length, can be used to insure the proper distance between central nodes. This length is adjusted by turning the ball-ended bolt by means of a wrench which is slide onto the wrenching surfaces of the bolt.

The invention is described in more detail with reference to the figures which illustrate the desirable embodiment, assemblage of a member end to a central node using the connector means, and other structural arrangements of the connector means which also function as a pinned connector according to the invention.

FIG. 1 illustrates a connector means which includes a bearing seat 1, a coupling means 2, a ball-ended bolt 3, and a lock nut 4. A threaded rod extends from the spherical ball of the ball-ended bolt 3. The connector means attaches each end of a structural member consisting of a structural member 5 with two member endpieces 6 to a central node 7. The coupling means 2 includes a threaded cylindrical shell and a hollow spherical shell with a circular opening at the extreme end. The diameter of the circular opening in the coupling means 2 is larger than the diameter of the threaded rod of the ball-ended bolt 3 to permit small rotations of the member ends about an axis transverse to the longitudinal axis of a member. The inner diameter of the shell of the coupling means 2 is slightly larger than the diameter of the ball to permit rotational freedom. A bearing seat 1 has a concave spherical recess sized to accommodate the spherical ball of a ball-ended bolt 3. A wrenching socket 10 at the base of the concave recess 8 allows the bearing seat 1 to be turned with an allen-type wrench and screwed into a socket in a central node 7. The ball-ended bolt 3 has a wrenching surface 9 to permit adjustment of the distance between two central nodes by turning the bolt 3. The connector means in this figure functions as a pinned type connector for attaching structural members to central nodes enabling the erection of lattice structures.

Figure 2A:
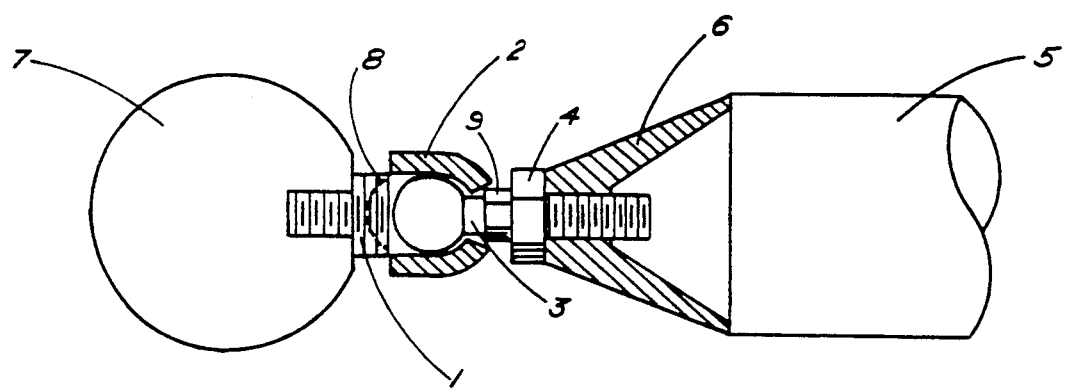
FIG. 2a illustrates the initial positioning of the connector means.

FIG. 2a illustrates the positioning of the connector means prior to attachment of a member to two central nodes. The coupling means 2, ball-ended bolt 3, and lock nut 4 are preattached to the member endpieces 6 with the ball-ended bolt 3 screwed tightly into the member endpiece 6. A bearing seat 1 is preattached to a central node 7 In this position, a member with attached connector means may be fitted between two spheres that are fixed in space with attached bearing seats.

Figure 2B:
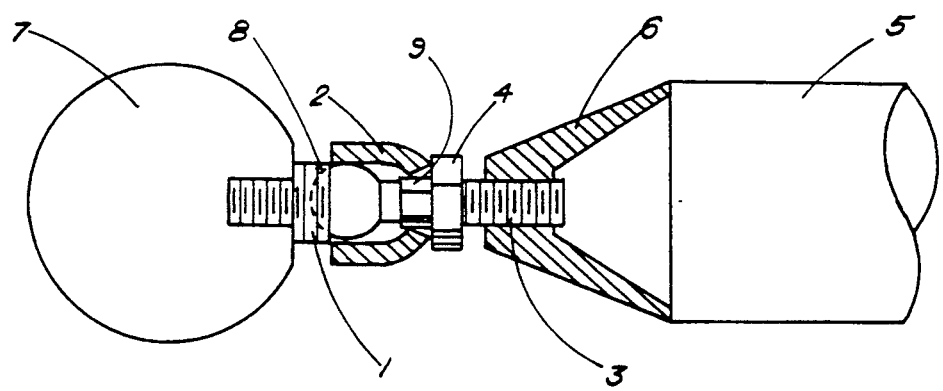
FIG. 2b illustrates the positioning of the connector means after the spherical ball of the bolt is seated.

FIG. 2b illustrates the spherical ball of a ball-ended bolt 3 seated in the concave recess of a bearing seat 1 achieved by turning the lock nut 4. The wrenching surface 9 of the ball-ended bolt 3 is slightly larger than the threaded segment causing the lock nut 4 to act as a bolt head when turned in the direction of the ball. The wrenching surface 9 is slightly smaller than the hole in the coupling means 2 permitting the coupling means 2 to slide over the wrenching surface 9 while the ball is being seated.

Figure 2C:
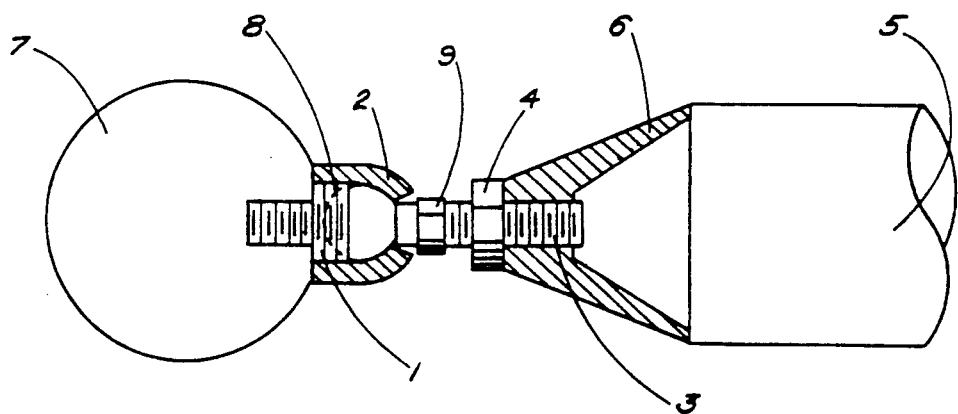
FIG. 2c illustrates the final positioning of the connector means after the coupling means and the lock nut are tightened.

FIG. 2c illustrates the coupling means 2 screwed onto the bearing seat 1 to attach a member end to a central node 7. In this arrangement the wrenching surface 9 is now exposed permitting final adjustment of the length between two central nodes. Upon adjustment, the lock nut 4 is tightened to fix the length between the spheres at the member ends.

Figure 3A:
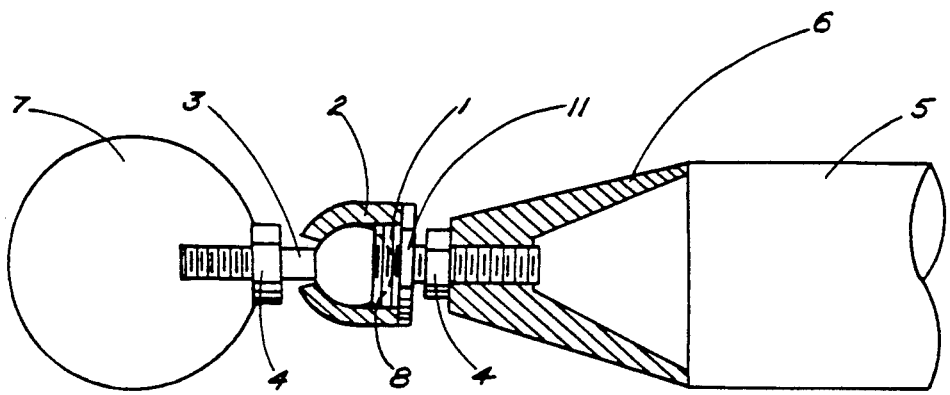
FIG. 3a illustrates an alternate arrangement of the connector means in which the bearing seat unscrews from the tapered endpiece.

FIG. 3a illustrates a view of a connector means consisting of a bearing seat 1, a coupling means 2, a ball-ended bolt 3, and a lock nut 4. In this embodiment, the ball-ended bolt 3 and coupling means 2 are attached to the central node 7 prior to assembly. The bearing seat 1 and lock nut 4 are attached to the member endpiece 6. The bearing seat 1 has an enlarged wrenching collar 11 which permits the bearing seat 1 to be unscrewed from the member endpiece 6 and which serves as a restraint from over tightening the coupling means 2 which would lock the spherical ball and prevent rotation of the member ends. The connector means in FIG. 3a also serves as a pinned type connector for attaching structural members to central nodes enabling the erection of lattice structures.

Figure 3B:
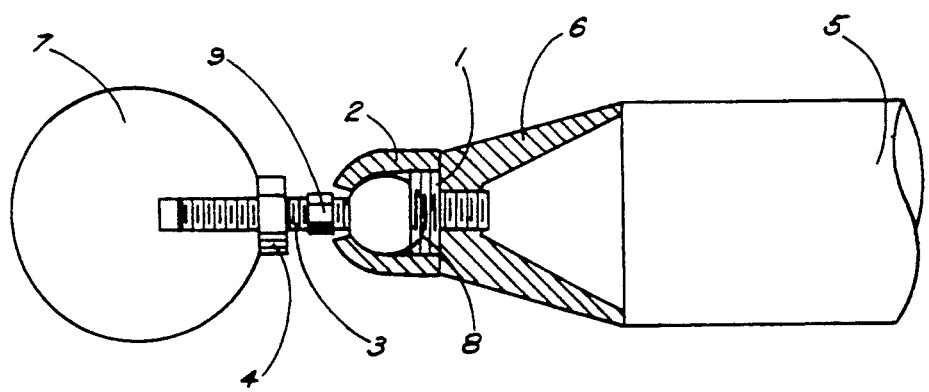
FIG. 3b illustrates an alternate arrangement of the connector means where the bearing seat is on the member end and the ball-ended bolt unscrews from the central node.

FIG. 3b illustrates a view of a connector means consisting of a bearing seat 1, a coupling means 2, a ball-ended bolt 3, and a lock nut 4. The bearing seat 1 is attached to the member endpiece 6 prior to assembly while the ball-ended bolt 3, coupling means 2, and lock nut 4 are attached to the central node 7. In this embodiment the spherical ball is seated in the concave recess 8 of the bearing seat 1 by unscrewing the ball-ended bolt 3 from the central node 7. The connector system shown in FIG. 3b functions as a pinned type connector for attaching structural members to central nodes enabling the erection of lattice structures.

FIG. 1 along with FIGS. 2a, 2b, and 2c illustrate the preferred embodiment of this invention. In this arrangement, the axes of rotation is closer to the intersection of the member axes and therefore better conforms to the theoretical assumption that the pin location is at the intersection of the member axes. Also in the embodiment illustrated in FIG. 1, the connection displays a higher degree of stability by eliminating distortions in the ball-ended bolt 3 between the axis of rotation and the bearing surface of the central node 7.

Although the description above contains many specificities, these should not be construed as limiting the scope of the invention but as merely providing illustrations of some of the preferred embodiments of this invention. For example, the central nodes may be polyhedral; the coupling means may be cylindrical; the bearing seat may have a tapered segment between the enlarged portion and the threaded portion affixed to a central node; etc.

Thus the scope of the invention should be determined by the appended claims and their legal equivalents, rather than by the examples given.

I claim:

1. A pin connector means comprising:
   (a) a ball-ended bolt, said ball-ended bolt having: a spherical ball at one end, surface of said spherical ball is finished to be of low friction, and a threaded rod extending from said spherical ball, said threaded rod screwably affixes into an endpiece of a structural member;
   (b) a bearing seat for receiving said spherical ball of said ball-ended bolt, surface of said bearing seat is finished to be of low friction, said bearing seat being affixed to a central node, said bearing seat has a concave bearing surface for receiving said spherical ball of said ball-ended bolt and a threaded member, said threaded member screwably affixes said bearing seat to said central node, said concave bearing surface has a wrenching socket enabling said bearing seat to be affixed to said central node; and
   (c) a means for coupling said spherical ball of said ball-ended bolt to said bearing seat; whereby said ball-ended bolt when affixed to said structural member is enabled to rotate about an axis transverse to the longitudinal axis of said structural member.

2. The pin connector means of claim 1 further comprising: a means for locking said threaded rod of said ball-ended bolt in said endpiece of said structural member.

3. The pin connector means of claim 2 wherein said means for locking said threaded rod of said ball-ended bolt in said endpiece of said structural member is a lock nut.

4. The pin connector means of claim 1 wherein said threaded rod has a plurality of wrenching surfaces enabling adjustment of the distance between two said central nodes.

5. The pin connector means of claim 1 wherein said central node receives a plurality of said bearing seats.

6. The pin connector means of claim 1, wherein said means for coupling comprises a hemispherical portion with an enlarged hole at the pole of said hemisphere, and a cylindrical threaded portion that together encase said spherical ball of said ball-ended bolt; said means for coupling enabled to screwably affix to said bearing seat; and wherein the diameter of said enlarged hole is somewhat larger than the diameter of said threaded rod enabling rotation of said ball-ended bolt about an axis transverse to said longitudinal axis of said structural member.

7. A latticework comprising:
(a) a plurality of central nodes;
(b) a plurality of structural members, said structural members being enabled to removably affix to a central node using a pin connector means, said pin connector means including:
(i) a ball-ended bolt, said ball-ended bolt having: a spherical ball at one end, surface of said spherical ball is finished to be of low friction, and a threaded rod extending from said spherical ball, said threaded rod screwably affixes into an end of one of said structural members;
(ii) a bearing seat for receiving said spherical ball of said ball-ended bolt, surface of said bearing seat is finished to be of low friction, said bearing seat being affixed to one of said central nodes, said bearing seat has a concave bearing surface for receiving said spherical ball of said ball-ended bolt; and a threaded extension, said threaded extension screwably affixes said bearing seat to said central node, and a wrenching socket in the base of said concave bearing surface; and,
(iii) a means for coupling said spherical ball of said ball-ended bolt to said bearing seat, whereby said ball-ended bolt can rotate about an axis transverse to the longitudinal axis of said structural members, and said central nodes being enabled to receive a plurality of said pin connector means.

8. The latticework of claim 7 further comprising a means for locking said threaded rod of said ball-ended bolt in an endpiece of a structural member.

9. The latticework of claim 8 wherein said means for locking said threaded rod of said ball-ended bolt in said endpiece of said structural member is a lock nut.

10. The pin connector means of claim 7 wherein said threaded rod has a plurality of wrenching surfaces enabling the distance between two said central nodes to be adjusted.

11. The latticework of claim 7 wherein a central node receives a plurality of said bearing seats.

12. The pin connector means of claim 7, wherein said means for coupling comprises a hemispherical portion with an enlarged hole in the pole of said hemisphere, and a cylindrical threaded portion that together encase said spherical ball of said ball-ended bolt; said means for coupling being enabled to screwably affix onto said bearing seat; and whereby the diameter of said enlarged hole is somewhat larger than the diameter of said threaded rod enabling said ball-ended bolt to rotate about axis transverse to said longitudinal axis of said structural member.

13. A connector means for attaching structural members into a latticework having a plurality of central nodes comprising:
(a) ball-ended bolt, said ball-ended bolt having:
(i) a spherical ball on a first end, the surface of said spherical ball finished to form a low friction surface;
(ii) a threaded stem on a second end, said threaded stem enabled to engage an endpiece on each end of one of said structural members; and,
(iii) a plurality of wrenching surfaces on said stem between said spherical ball and said threads, said wrenching surfaces enabling a length adjustment between two said central nodes;
(b) a bearing seat, said bearing seat having:
(i) an enlarged threaded end with a concave recess shaped to receive said spherical ball of said ball-ended bolt, surface of said concave recess is finished to form a low friction bearing surface;
(ii) a smaller threaded stem adapted to screwably engage a threaded socket of one of said central nodes; and,
(iii) a wrenching socket in the base of said concave recess enabling said bearing seat to be affixed to one of said central nodes;
(c) a coupling means, said coupling means having a hemi-spherical portion with an enlarged hole in the pole of said hemisphere, and a cylindrical threaded portion that together encase said spherical ball of said ball-ended bolt; said coupling means being screwably affixed onto said enlarged portion of said bearing seat; and wherein the diameter of said enlarged hole is somewhat larger than the diameter of said threaded rod enabling said ball-ended bolt to rotate about an axis transverse to the longitudinal axis of said structural members.

14. The connector means of claim 13 further comprising a means for locking said ball-ended bolt in said structural member.

15. The connector means of claim 14 wherein said means for locking said ball-ended bolt in said structural member is a lock nut.

* * * * *